US006913466B2

(12) United States Patent
Stanfield et al.

(10) Patent No.: US 6,913,466 B2
(45) Date of Patent: Jul. 5, 2005

(54) SYSTEM AND METHODS FOR TRAINING A TRAINEE TO CLASSIFY FUNDAMENTAL PROPERTIES OF MEDIA ENTITIES

(75) Inventors: Geoffrey R. Stanfield, Seattle, WA (US); Eric Bassman, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 450 days.

(21) Appl. No.: 09/934,774

(22) Filed: Aug. 21, 2001

(65) Prior Publication Data

US 2003/0041066 A1 Feb. 27, 2003

(51) Int. Cl.[7] .............................................. G09B 19/00
(52) U.S. Cl. .................... 434/219; 434/307 R; 434/353; 84/470 R
(58) Field of Search .............................. 434/307 R, 219, 434/353; 84/470 R; 707/7, 104.1, 5, 102; 369/30.39; 700/214; 705/11

(56) References Cited

U.S. PATENT DOCUMENTS

| | | | | |
|---|---|---|---|---|
| 5,616,876 A | * | 4/1997 | Cluts ......................... | 84/609 X |
| 5,672,060 A | * | 9/1997 | Poor ....................... | 434/322 X |
| 5,832,495 A | * | 11/1998 | Gustman ................. | 707/102 X |
| 5,987,302 A | * | 11/1999 | Driscoll et al. ............. | 434/353 |
| 5,991,595 A | * | 11/1999 | Romano et al. ......... | 434/353 X |
| 6,201,176 B1 | * | 3/2001 | Yourlo ..................... | 84/609 X |
| 6,248,946 B1 | * | 6/2001 | Dwek ....................... | 84/609 X |
| 6,267,601 B1 | * | 7/2001 | Jongsma et al. ......... | 434/323 X |
| 6,298,351 B1 | * | 10/2001 | Castelli et al. .......... | 707/102 X |
| 6,446,083 B1 | * | 9/2002 | Leight et al. ............ | 707/104.1 |
| 6,539,395 B1 | * | 3/2003 | Gjerdingen et al. .... | 707/102 X |
| 6,545,209 B1 | * | 4/2003 | Flannery et al. .......... | 84/609 X |
| 2001/0034730 A1 | * | 10/2001 | Bhandari et al. ........... | 707/7 X |
| 2003/0031996 A1 | * | 2/2003 | Robinson .................... | 434/350 |

OTHER PUBLICATIONS

Boneh, D. et al., "Collusion–secure fingerprinting for digital data," *IEEE Trans. Information Theory*, 1998, 44(5), 1897–1905.

Bresin, R. et al., "Synthesis and decoding of emotionally expressive music performance," *IEEE SMC'99 Conference Proceedings. 1999 IEEE Int'l Conf. On Systems, Man, and Cybernetics*, 1999, vol. 4, 317–322.

Camurri, A. et al., "Multi–Paradigm Software Environment for the Real–Time Processing of Sound, Music and Multimedia," *Knowledge–Based Systems*, 1994, 7(2), 114–126.

Camurri, A. et al., "Music and Multimedia Knowledge Representation and Reasoning—The Harp System," *Computer Music J.*, 1995, 19(2sum), 34–58.

Camurri, A., "Music content processing and multimedia: Case studies and emerging applications of intelligent interactive systems," *J. New Music Res.*, 1999, 28(4), 351–363.

(Continued)

*Primary Examiner*—Chanda L. Harris
(74) *Attorney, Agent, or Firm*—Woodcock Washburn LLP

(57) ABSTRACT

A system and methods are provided for training a trainee to analyze media, such as music, in order to recognize and assess the fundamental properties of any piece of media, such as a song or a segment of a song. The process includes an initial tutorial and a double grooving process. The tutorial phase exposes the trainee to a canonical set of classifications and then exposes the trainee to certain definitive song examples for each classification level of fundamental properties. The double grooving phase leverages the skills of the experts that defined the canonical set of classification terms to ensure that new listeners, even though exposed to the tutorial, appropriately recognize all fundamental musical properties. Thus, for specific song examples, a new listener matches results with the system experts within a degree of tolerance. When a high enough degree of cross-listening consensus is reached, the new listener becomes a groover and can classify new songs or segments of songs.

30 Claims, 5 Drawing Sheets

OTHER PUBLICATIONS

Cohen, W.W. et al., "Web–collaborative filtering: recommending music by crawling the Web," *Comp. Networks–Int. J. Comp. Telecomm. Networking*, 2000, 33(1–6), 685–698.

Craner, P.M., "New tool for an ancient art—the computer and music," *Comput. Humanities*, 1991, 25(5), 303–313.

DeRoure, D.C. et al., "Content–based navigation of music using melodic pitch contours," *Multimedia Systems*, 2000, 8(3), 190–200.

Gentner, T.Q. et al., "Perceptual classification based on the component structure of song in European starlings," *J. Acoustical Soc. Am.*, Jun., 2000, 107(6), 3369–3381.

Goldman, C.V. et al., "NetNeg: A connectionist–agent integrated system for representing musical knowledge," *Annals. Math. Artifical Intelligence*, 1999, 25(1–2), 69–90.

Hori, T. et al., "Automatic music score recognition/play system based on decision based neural networks," *1999 IEEE Third Workshop on Mulitmedia Signal Processing*, Ostermann, J. et al. (eds.), 1999, 183–184.

Kieckhefer, E. et al., "A computer program for sequencing and presenting complex sounds for auditory neuroimaging studies," *J. Neurosc. Methods*, Aug., 2000, 101(1), 43–48.

Kirk, R. et al., "Midas–Milan—an open distributed processing system for audio signal processing," *J. Audio Enginerr. Soc.*, 1996, 44(3), 119–129.

Krulwich, B., "Lifestyle finder—Intelligent user profiling using large–scale demographic data," *AI Magazine*, 1997, 18(2sum), 37–45.

Li, D. et al., "Classification of general audio data for content–based retrieval," *Pattern Recogn. Letts.*, 2001, 22(5), 533–544.

Liang, R.H. et al., "Impromptu Conductor—A Virtual Reality System for Music Generation Based on Supervised Learning," *Displays*, 1994, 15(3), 141–147.

Logrippo, L., "Cluster analysis for the computer–assisted statistical analysis of melodies," *Computers Humanities*, 1986, 20(1), 19–33.

Moreno, P.J. et al., "Using the Fisher Kernal Method for Web Audio Classification," *2000 IEEE Int'l Conf. On Acoustics, Speech, and Signal Processing, Proceedings*, 2000, vol. 4, 2417–2420.

Pirn, R., "Some Objective and Subjective Aspects of 3 Acoustically Variable Halls," *Appl. Acoustics*, 1992, 35(3), 221–231.

Serra, A., "New solutions for the transmission of music. Possible methods in view of the reduction of the pass band," *Revista Espanola de Electronica*, Jul., 1976, 23(260), 34–35 (English language abstract attached).

Smith, M.W.A., "A relational database for the study and quantification of tempo directions in music," *Comput. Humanities*, 1994, 28(2), 107–116.

Speiser, J.M. et al., "Signal processing computations using the generalized singular value decomposition," *Proceedings of SPIE—The Int'l Socity for Optical Engineering. Real Time Signal Processing VII*, Bellingham, WA, 1984, 47–55.

Strawn, J. (ed.), "Digital Audio Engineering: An Anthology," *Digital Audio Eng. An Anthol*, Los Altos, CA, 1985.

Yoder, M.A. et al., "Using Multimedia and the Web to teach the theory of digital multimedia signals," *Proceedings. Frontiers in Education, 1995 $25^{th}$ Annual Conference. Engineering Education for the $21^{st}$ Century, IEEE*, Budny, D. et al. (eds.), Nov. 1–4, 1995, vol. 2, Atlanta, GA.

Zhang, T. et al., "Audio content analysis for online audio–visual data segmentation and classification," *IEEE Trans. on Speech and Audio Processing*, May, 2001, 9(4), 441–457.

Zhang, T. et al., "Heuristic approach for generic audio data segmentation and annotation," *Proceedings ACM Multimedia 99*, 1999, 67–76.

Pesavento, M. et al., Unitary root music with a real–value eigendecomposition: A theoretical and experimental performance study, *IEEE Trans. Signal Processing*, 2000, 48(5), 1306–1314.

* cited by examiner

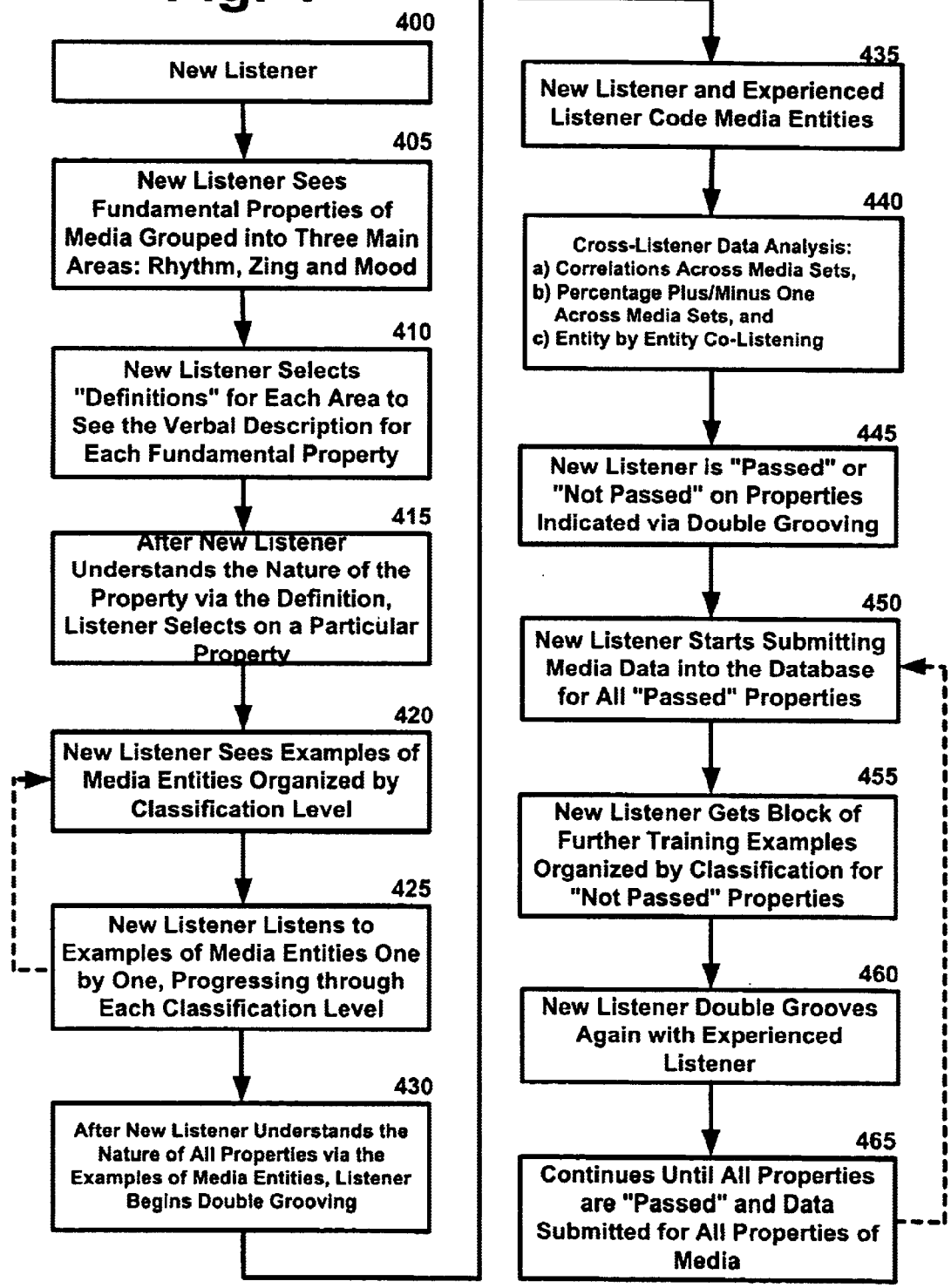

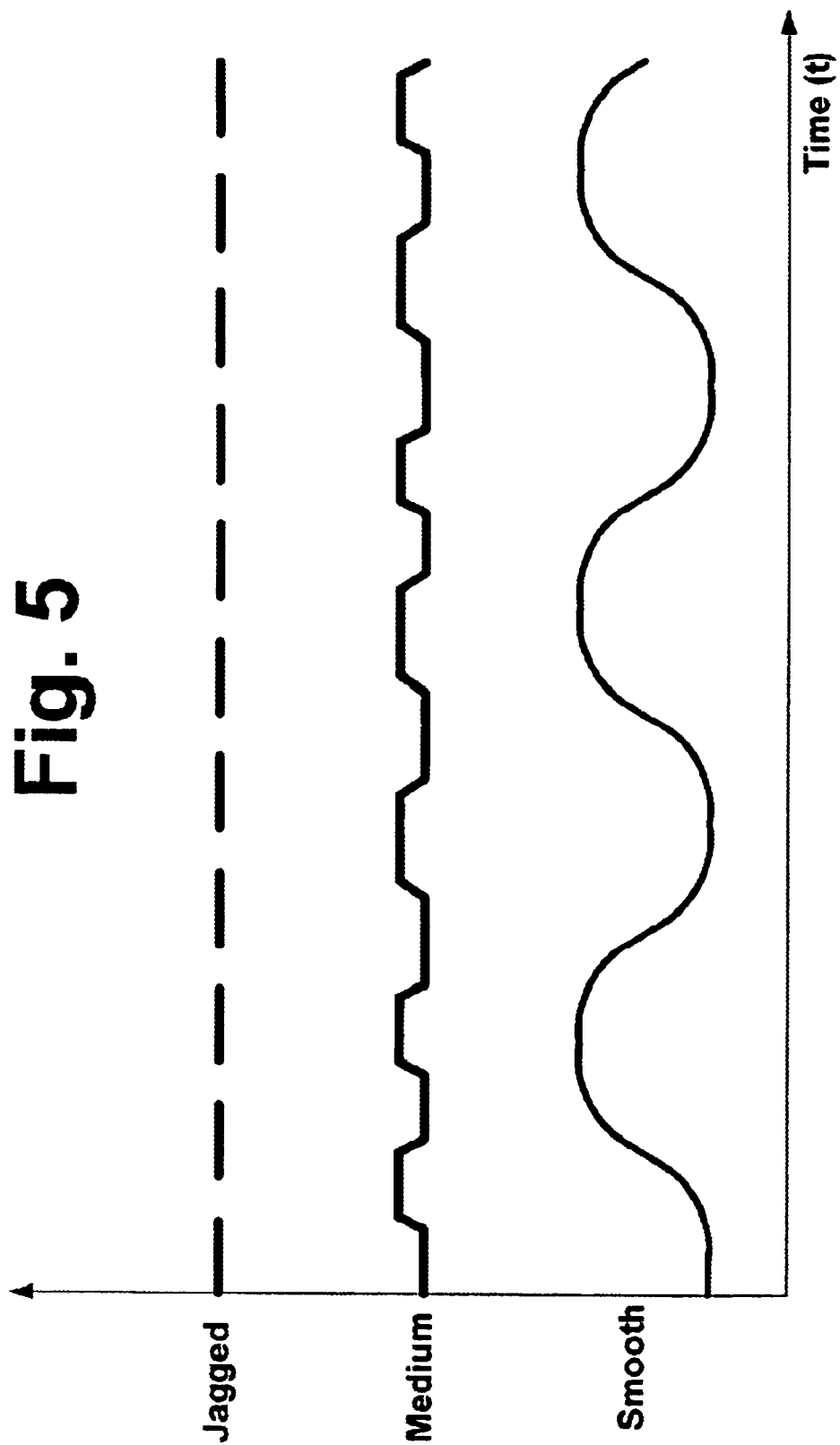

US 6,913,466 B2

SYSTEM AND METHODS FOR TRAINING A TRAINEE TO CLASSIFY FUNDAMENTAL PROPERTIES OF MEDIA ENTITIES

CROSS REFERENCE TO RELATED APPLICATIONS

This application is related by subject matter to commonly assigned U.S. Pat. No. 6,545,209, issued on a Apr. 8, 2003, entitle "Music content Characteristic Identification and Matching" and to the following commonly assigned U.S. Patent Applications: U.S. patent application Ser. No. 09/900,230, filed on Jul. 6, 2001, entitled "System and Method for the Automatic Transmission of New, High Affinity Media;" U.S. patent application Ser. No. 09/934,071, filed Aug. 20, 2001, entitled "Method and System for Providing Adaptive Media Property Classification;" U.S. patent application Ser. No. 09/900,059, filed Jul. 6, 2001, entitled "System and Methods for Providing Automatic Classification of Media Entities According to Consonance Properties;" U.S. patent application Ser. No. 09/935,349, filed Aug. 21, 2001, entitled "Systems and Methods for Providing Automatic Classification of Media Entities According to Sonic Properties;" U.S. patent application Ser. No. 09/905,345, filed Jul. 13, 2001, entitled "System and Method for Providing Automatic Classification of Media Entities According to Tempo Properties;" U.S. patent application Ser. No. 09/904,465, filed Jul. 13, 2001, entitled "System and Methods for Automatic DSP Processing;" U.S. patent application Ser. No. 09/905,011, filed Jul. 13, 2001, entitled "System and Method for Dynamic Playlist of Media;" U.S. patent application Ser. No. 09/942,509, filed Aug. 29, 2001, entitled "System and Method for Providing Automatic Classification of Media Entities According to Melodic Movement Properties;" and U.S. patent application Ser. No. 09/928,004, filed Aug. 10, 2001, entitled "System and Method for Audio Fingerprinting," the contents of which are hereby incorporated into this present application in their entirely.

NOTICE OF TRADEMARK USE

The names of actual recording artists referred to herein are trademarks of their respective owners. No association with any recording artist is intended or should be inferred.

1. Field of the Invention

The present invention relates to a system and methods for training a trainee to assign values to fundamental properties of media entities, such as songs.

2. Background of the Invention

Classifying information that has subjectively perceived attributes or characteristics is difficult. When the information is one or more musical compositions, classification is complicated by the widely varying subjective perceptions of the musical compositions by different listeners. One listener may perceive a particular musical composition as "hauntingly beautiful" whereas another may perceive the same composition as "annoyingly twangy".

In the classical music context, musicologists have developed names for various attributes of musical compositions. Terms such as adagio, fortissimo, or allegro broadly describe the strength with which instruments in an orchestra should be played to properly render a musical composition from sheet music. In the popular music context, there is less agreement upon proper terminology. Composers indicate how to render their musical compositions with annotations such as brightly, softly, etc., but there is no consistent, concise, agreed-upon system for such annotations.

As a result of rapid movement of musical recordings from sheet music to pre-recorded analog media to digital storage and retrieval technologies, this problem has become acute. In particular, as large libraries of digital musical recordings have become available through global computer networks, a need has developed to classify individual musical compositions in a quantitative manner based on highly subjective features, in order to facilitate rapid search and retrieval of large collections of compositions.

Musical compositions and other information are now widely available for sampling and purchase over global computer networks through online merchants such as AMAZON.COM®, BARNESANDNOBLE.COM®, CDNOW.COM®, etc. A prospective consumer can use a computer system equipped with a standard Web browser to contact an online merchant, browse an online catalog of pro-recorded music, select a song or collection of songs ("album"), and purchase the song or album for shipment direct to the consumer. In this context, online merchants and others desire to assist the consumer in making a purchase selection and desire to suggest possible selections for purchase. However, current classification systems and search and retrieval systems are inadequate for these tasks.

A variety of inadequate classification and search approaches are now used. In one approach, a consumer selects a musical composition for listening or for purchase based on past positive experience with the same artist or with similar music. This approach has a significant disadvantage in that it involves guessing because the consumer has no familiarity with the musical composition that is selected.

In another approach, a merchant classifies musical compositions into broad categories or genres. The disadvantage of this approach is that typically the genres are too broad. For example, a wide variety of qualitatively different albums and songs may be classified in the genre of "Popular Music" or "Rock and Roll".

In still another approach, an online merchant presents a search page to a client associated with the consumer. The merchant receives selection criteria from the client for use in searching the merchant's catalog or database of available music. Normally the selection criteria are limited to song name, album title, or artist name. The merchant searches the database based on the selection criteria and returns a list of matching results to the client. The client selects one item in the list and receives further, detailed information about that item. The merchant also creates and returns one or more critics' reviews, customer reviews, or past purchase information associated with the item.

For example, the merchant may present a review by a music critic of a magazine that critiques the album selected by the client. The merchant may also present informal reviews of the album that have been previously entered into the system by other consumers. Further, the merchant may present suggestions of related music based on prior purchases of others. For example, in the approach of AMAZON.COM®, when a client requests detailed information about a particular album or song, the system displays information stating, "People who bought this album also bought . . . " followed by a list of other albums or songs. The list of other albums or songs is derived from actual purchase experience of the system. This is called "collaborative filtering".

However, this approach has a significant disadvantage, namely that the suggested albums or songs are based on extrinsic similarity as indicated by purchase decisions of others, rather than based upon objective similarity of intrinsic attributes of a requested album or song and the suggested albums or songs. A decision by another consumer to purchase two albums at the same time does not indicate that the two albums are objectively similar or even that the consumer liked both. For example, the consumer might have bought one for the consumer and the second for a third party having greatly differing subjective taste than the consumer. As a result, some pundits have termed the prior approach as the "greater fools" approach because it relies on the judgment of others.

Another disadvantage of collaborative filtering is that output data is normally available only for complete albums and not for individual songs. Thus, a first album that the consumer likes may be broadly similar to second album, but the second album may contain individual songs that are strikingly dissimilar from the first album, and the consumer has no way to detect or act on such dissimilarity.

Still another disadvantage of collaborative filtering is that it requires a large mass of historical data in order to provide useful search results. The search results indicating what others bought are only useful after a large number of transactions, so that meaningful patterns and meaningful similarity emerge. Moreover, early transactions tend to over-influence later buyers, and popular titles tend to self-perpetuate.

In a related approach, the merchant may present information describing a song or an album that is prepared and distributed by the recording artist, a record label, or other entities that are commercially associated with the recording. A disadvantage of this information is that it may be biased, it may deliberately mischaracterize the recording in the hope of increasing its sales, and it is normally based on inconsistent terms and meanings.

In still another approach, digital signal processing (DSP) analysis is used to try to match characteristics from song to song, but DSP analysis alone has proven to be insufficient for classification purposes. While DSP analysis may be effective for somegroups or classes of songs, it is ineffective for others, and there has so far been no technique for determining what makes the technique effective for some music and not others. Specifically, such acoustical analysis as has been implemented thus far suffers defects because 1) the effectiveness of the analysis is being questioned regarding the accuracy of the results, thus diminishing the perceived quality by the user and 2) recommendations can only be made if the user manually types in a desired artist or song title from that specific website. Accordingly, DSP analysis, by itself, is unreliable and thus insufficient for widespread commercial or other use.

Accordingly, there is a need for an improved method of classifying information that is characterized by the convergence of subjective or perceptual analysis and DSP acoustical analysis criteria. With such a classification technique, it would be desirable to provide training to humans at the front end of the classification process in order to generate more uniform human classification of media. It would be further desirable to provide a system and method as a result of which an individual is trained to analyze media, such as songs, in order to recognize and assess the fundamental media properties of any piece of media. It would be still further desirable to utilize a playlist generating engine to dynamically produce playlist(s) suited to the above need for training individuals.

SUMMARY OF THE INVENTION

In view of the foregoing, the present invention provides a system and methods for training a trainee to analyze media, such as music, in order to recognize and assess the fundamental properties of any piece of media, such as a song or a segment of a song. The process of the present invention includes an initial tutorial and a double grooving process. The tutorial phase exposes the trainee to a canonical set of classifications and then exposes the trainee to certain definitive song examples for each classification level of fundamental properties. The double grooving phase leverages the skills of the experts that defined the canonical set of classification terms to ensure that new listeners, even though exposed to the tutorial, appropriately recognize all fundamental musical properties. Thus, for specific song examples, a new listener matches results with the system experts within a degree of tolerance. When a high enough degree of cross-listening consensus is reached, the new listener becomes a groover and can classify new songs or segments of songs.

Other features of the present invention are described below.

BRIEF DESCRIPTION OF THE DRAWINGS

The system and methods for training a trainee to assign values to fundamental properties of media entities, such as songs are further described with reference to the accompanying drawings in which:

FIG. 4 is a flowchart illustrating an exemplary training process in accordance with the present invention; and FIG. 5 is an illustration of exemplary time-varying waveforms to generally show the concept of flow.

DETAILED DESCRIPTION OF PREFERRED EMBODIMENTS

Overview

The present invention implements a process by which an individual is trained to analyze media, such as music, in order to recognize and assess the fundamental properties of any piece of media, such as a song or a segment of a song.

The process of the present invention includes two phases: an initial tutorial, such as a Web-based tutorial and a double grooving process. Initially, experts define a canonical set of classification terms, ranges and descriptions for use in the classification of fundamental properties of media entities. The tutorial phase exposes the trainee to the chosen canonical set of classifications and then exposes the trainee to certain definitive song examples for each classification level of every fundamental property.

The double grooving phase leverages the skills of the experts that defined the canonical set of classification terms to ensure that new listeners, even though exposed to the tutorial, appropriately recognize all fundamental musical properties. Thus, for specific song examples, a new listener matches results with the system experts within a degree of tolerance e.g., 90–95% accuracy. When a high enough degree of cross-listening consensus is reached, the new listener becomes a groover.

Exemplary Computer and Network Environments

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having access to appropriate classification data and/or an appropriate playlist generation engine.

Figure 1:
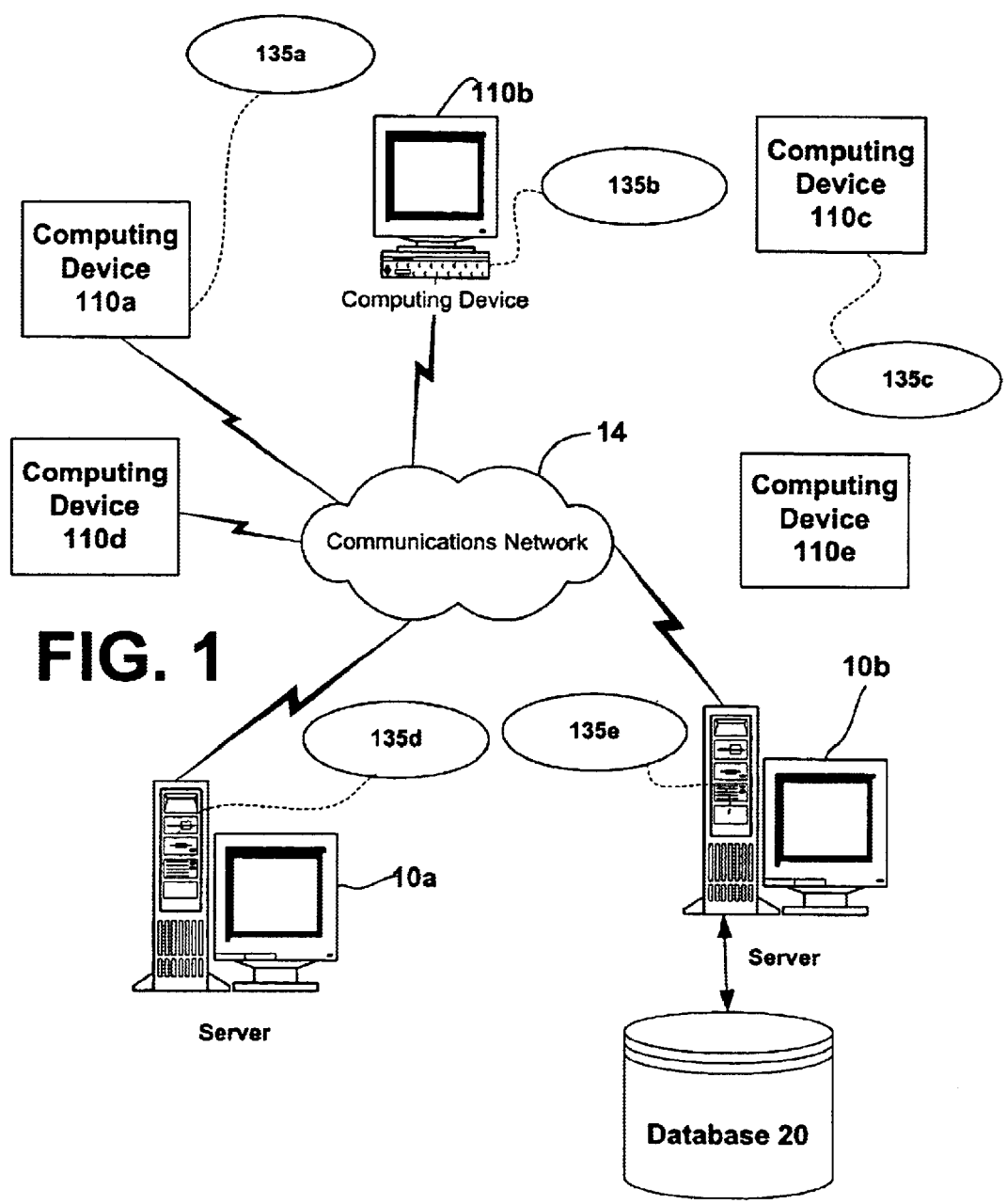
FIG. 1 is a block diagram representing an exemplary network environment in which the present invention may be implemented.

FIG. 1 illustrates an exemplary network environment, with a server in communication with client computers via a network, in which the present invention may be employed. As shown, a number of servers 10a, 10b, etc., are interconnected via a communications network 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, and the like in accordance with the present invention. It is thus contemplated that the present invention may apply to any computing device in connection with which it is desirable to provide classification services for different types of content such as music, video, other audio, etc. In a network environment in which the communications network 14 is the Internet, for example, the servers 10 can be Web servers with which the clients 110a, 110b, 110c, 110d, 110e, etc. communicate via any of a number of known protocols such as hypertext transfer protocol (HTTP). Communications may be wired or wireless, where appropriate. Client devices 110 may or may not communicate via communications network 14, and may have independent communications associated therewith. For example, in the case of a TV or VCR, there may or may not be a networked aspect to the control thereof. Each client computer 110 and server computer 10 may be equipped with various application program modules 135 and with connections or access to various types of storage elements or objects, across which files may be stored or to which portion(s) of files may be downloaded or migrated. Any server 10a, 10b, etc. may be responsible for the maintenance and updating of a database 20 in accordance with the present invention, such as a database 20 for storing classification information, music and/or software incident thereto. Thus, the present invention can be utilized in a computer network environment having client computers 110a, 110b, etc. for accessing and interacting with a computer network 14 and server computers 10a, 10b, etc. for interacting with client computers 110a, 110b, etc. and other devices 111 and databases 20.

Classification

In accordance with one aspect of the present invention, a unique classification is implemented which combines human and machine classification techniques in a convergent manner, from which a canonical set of rules for classifying music may be developed, and from which a database, or other storage element, may be filled with classified songs. With such techniques and rules, radio stations, studios and/or anyone else with an interest in classifying music can classify new music. With such a database, music association may be implemented in real time, so that playlists or lists of related (or unrelated if the case requires) media entities may be generated. Playlists may be generated, for example, from a single song and/or a user preference profile in accordance with an appropriate analysis and matching algorithm performed on the data store of the database. Nearest neighbor and/or other matching algorithms may be utilized to locate songs that are similar to the single song and/or are suited to the user profile.

Figure 2:
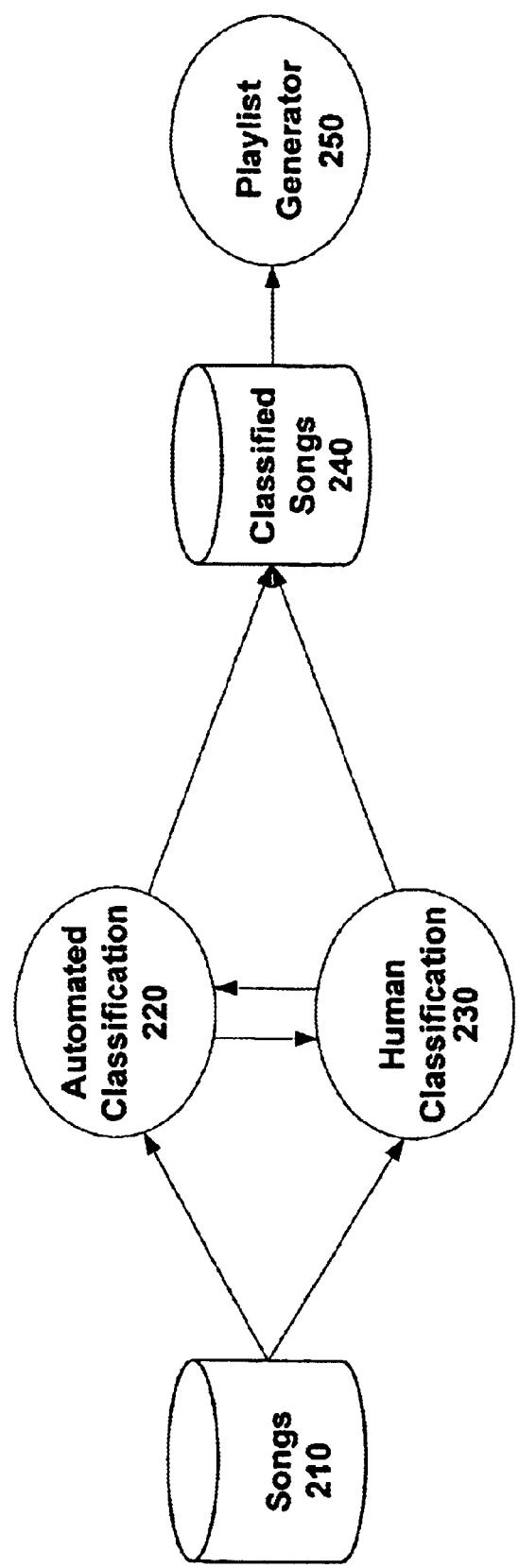
FIG. 2 is a high level block diagram representing the media content classification system utilized to classify media, such as music, in accordance with the present invention.

FIG. 2 illustrates an exemplary classification technique in accordance with the present invention. Media entities, such as songs 210, from wherever retrieved or found, are classified according to human classification techniques at 220 and also classified according to automated computerized DSP classification techniques at 230. 220 and 230 may be performed in either order, as shown by the dashed lines, because it is the marriage or convergence of the two analyses that provides a stable set of classified songs at 240. As discussed above, once such a database of songs is classified according to both human and automated techniques, the database becomes a powerful tool for generating songs with a playlist generator 250. A playlist generator 250 may take input(s) regarding song attributes or qualities, which may be a song or user preferences, and may output a playlist, recommend other songs to a user, filter new music, etc. depending upon the goal of using the relational information provided by the invention. In the case of a song as an input, first, a DSP analysis of the input song is performed to determine the attributes, qualities, likelihood of success, etc. of the song. In the case of user preferences as an input, a search may be performed for songs that match the user preferences to create a playlist or make recommendations for new music. In the case of filtering new music, the rules used to classify the songs in database 240 may be leveraged to determine the attributes, qualities, genre, likelihood of success, etc. of the new music.

In accordance with the present invention, once the classification rules and song database 240 take on a critical mass, defined as the processing of enough media entities to form a reasonably valid rule set and corresponding song database 240 within a threshold tolerance, playlist generator 250 may be a powerful tool for training new humans. For example, if a particular human is having difficulty learning a certain concept, playlists may be formed that emphasize (or de-emphasize) the effect to illustrate the concept in greater depth to a trainee. Naturally, at the outset, before such critical mass is reached, another playlist generator or manually formed playlists may be utilized. The training process of the present invention is described in more detail below. In effect, the rules can be used as a filter to supplement any other decision making processes with respect to the new music.

Figure 3:
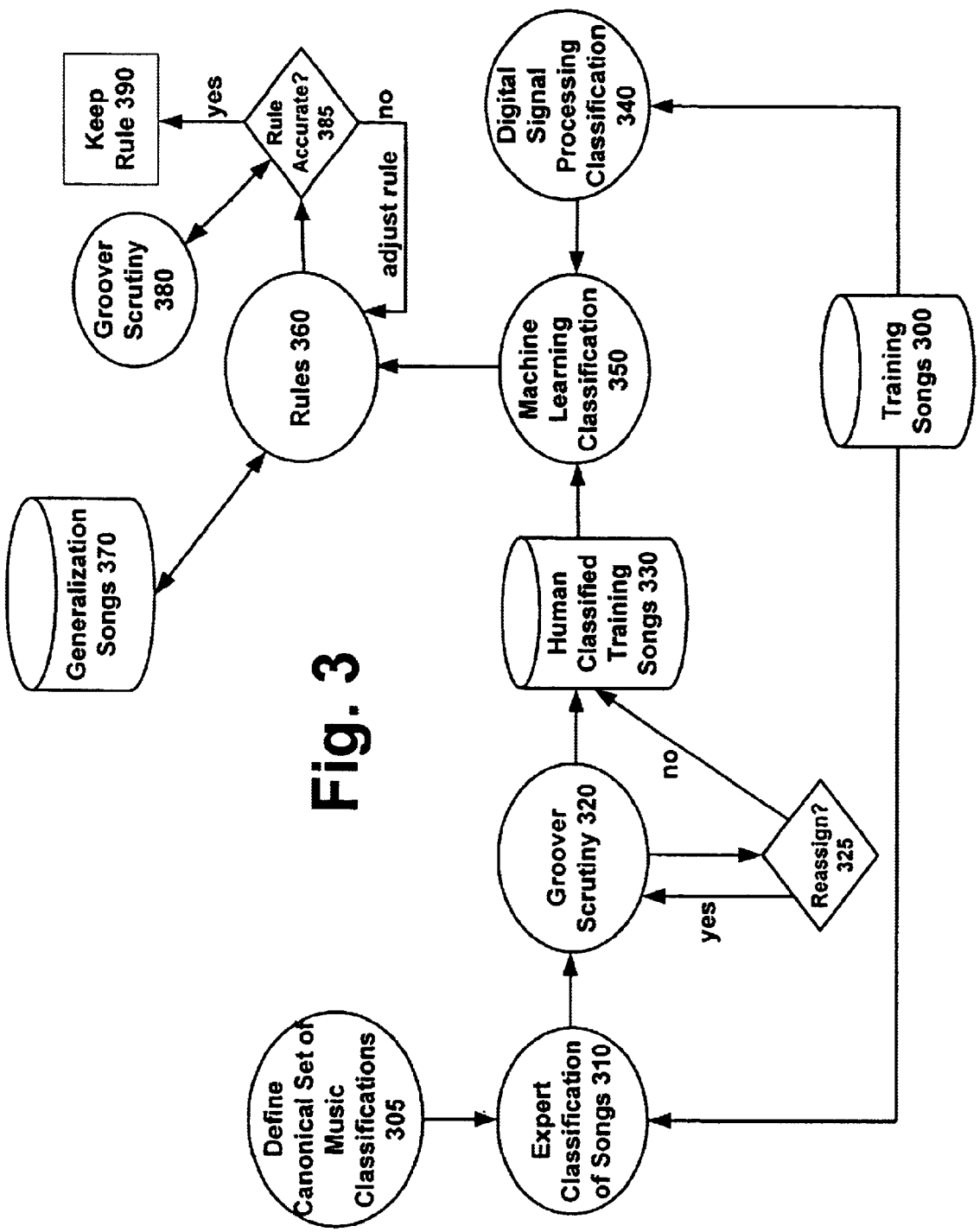
FIG. 3 is block diagram illustrating an exemplary method of the generation of general media classification rules from analyzing the convergence of classification in part based upon subjective and in part based upon digital signal processing techniques.

FIG. 3 illustrates a process that generates generalized rules for a classification system characterized by the convergence of subjective or perceptual analysis and DSP acoustical analysis criteria. A first goal is to train a database with enough songs so that the human and automated classification processes converge, from which a consistent set of classification rules may be adopted, and adjusted to accuracy. First, at 305, a general set of classifications are agreed upon in order to proceed consistently i.e., a consistent set of terminology is used to classify music in accordance with the present invention. At 310, a first level of expert classification is implemented, whereby experts classify a set of training songs in database 300. This first level of expert is fewer in number than a second level of expert, termed herein a groover, and in theory has greater expertise in classifying music than the second level of expert or groover. The songs in database 300 may originate from anywhere, and are intended to represent a broad cross-section of music. At 320, the groovers implement a second level of expert classification. There is a training process in accordance with the invention by which groovers learn to consistently classify music, for example to 92–95% accuracy. The groover scrutiny reevaluates the classification of 310, and reclassifies the music at 325 if the groover determines that reassignment should be performed before storing the song in human classified training song database 330. The present application describes this training process for training humans to recognize fundamental properties of media entities in greater detail below.

Before, after or at the same time as the human classification process, the songs from database 300 are classified according to digital signal processing (DSP) techniques at 340. Exemplary classifications for songs include, inter alia, tempo, sonic, melodic movement and musical consonance characterizations. Classifications for other types of media, such as video or software are also contemplated. The quantitative machine classifications and qualitative human classifications for a given piece of media, such as a song, are then placed into what is referred to herein as a classification chain, which may be an array or other list of vectors, wherein each vector contains the machine and human classification attributes assigned to the piece of media. Machine learning classification module 350 marries the classifications made by humans and the classifications made by machines, and in particular, creates a rule when a trend meets certain criteria. For example, if songs with heavy activity in the frequency spectrum at 3 kHz, as determined by the DSP processing, are also characterized as 'jazzy' by humans, a rule can be created to this effect. The rule would be, for example: songs with heavy activity at 3 kHz are jazzy. Thus, when enough data yields a rule, machine learning classification module 350 outputs a rule to rule set 360. While this example alone may be an oversimplification, since music patterns are considerably more complex, it can be appreciated that certain DSP analyses correlate well to human analyses.

However, once a rule is created, it is not considered a generalized rule. The rule is then tested against like pieces of media, such as song(s), in the database 370. If the rule works for the generalization song(s) 370, the rule is considered generalized. The rule is then subjected to groover scrutiny 380 to determine if it is an accurate rule at 385. If the rule is inaccurate according to groover scrutiny, the rule is adjusted. If the rule is considered to be accurate, then the rule is kept as a relational rule e.g., that may classify new media.

The above-described technique thus maps a pre-defined parameter space to a psychoacoustic perceptual space defined by musical experts. The process whereby people are trained to be or certified as "musical experts",for purposes of uniformly applying classification techniques is the subject of the present application.

Training Process—Tutorial and Double Grooving

As described above, the present invention implements a process by which an individual is trained to analyze media, such as music, in order to recognize and assess the fundamental properties of any piece of media, such as a song or a segment of a song. Any number or kinds of fundamental properties well suited to the classification of media may be utilized in accordance with the present invention. Consequently, while exemplary embodiments below utilize various terms of art in the classification fields, and various ranges and/or descriptions associated therewith, different ranges and/or synonyms of the below descriptions may be implemented fully within the spirit and scope of the present invention.

The process of the present invention includes two phases: an initial tutorial, such as a Web-based tutorial and a double grooving process. Initially, experts recognized for their classification skills define a canonical set of classification terms, ranges and descriptions for use in the classification of media entities. The tutorial phase exposes the trainee to the chosen canonical set of classifications, and definitions thereof, that will be used for the classification of media entities, such as songs or song segments. Each of the classification terms may be further broken down into other classification terms, and each classification term may have a range or descriptions associated therewith. The tutorial phase also utilizes certain definitive song examples for each classification level of every fundamental property. A dynamic playlist generator, such as disclosed in commonly assigned U.S. patent application Ser. No. 09/905,011 is well suited to the task of analyzing and selecting music that fits a certain classification profile. Other playlist engines that utilize some or all of the classifications chosen for a particular implementation of the invention could be used as well. Experts could also confirm that the music generated by the engine is appropriate for demonstration of a level of a fundamental property. Thus, the initial tutorial exposes the new listener to definitions for the classification of fundamental properties and exposes the new listener to those particular song examples that highlight particular properties, and the nature of their variations.

400 to 425 of FIG. 4 illustrate an exemplary implementation of the tutorial phase, and in exemplary detail, at 400, a new listener enters the tutorial session on a networked or standalone computing device and sees at 405 the fundamental properties grouped into three main areas: Rhythm, Zing and Mood. The fundamental properties grouped into the three main areas have further sub-categories of fundamental properties. In the case of rhythm, the sub-categories may include Tempo, Time Signature, Rhythm Description, Rhythm Type and Rhythmic Activity. In the case of Zing, the sub-categories may include Consonance, Density, Melodic Movement and Weight. In the case of Mood, the sub-categories may include Emotional Intensity, Mood and Mood Description. There is a definition page for each property and sub-category that verbally describes the fundamental musical properties. Each fundamental musical property then has its own distinct page with the definitive song examples for each classification level. These examples are organized in order from 1 to 10 for those properties represented via a numerical continuum. For properties that have descriptive classifications, each classification has a distinct area. At 410, the new listener progresses through these pages, building up core knowledge of both fundamental properties as a whole, as well as the full spectrum of classification options for any particular fundamental property. At 415, after the new listener appreciates the verbal descriptions of the fundamental properties and sub-categories, the listener selects a particular property. At 420, the new listener is presented with media entities that correspond to or match up well with the selected property. In the case of musical entities, such as a song or a portion of a song, song examples are displayed to the user corresponding to the selected property. At 425, the new listener listens to the song examples one by one. 420 and 425 may be repeated until the new listener understands the nature of all the classification properties via the definitions and examples.

The double grooving phase leverages the skills of the experts that defined the canonical set of classification terms to ensure that new listeners, even though exposed to the tutorial, appropriately recognize all fundamental musical properties. Thus, for specific song examples, a new listener matches results with the system experts within a degree of tolerance e.g., 90–95% accuracy. When a high enough degree of cross-listening consensus is reached, a new listener becomes a groover, and is entitled to submit data for classifying new media entities, such as songs, for entry into a classified song database, such as database 240.

430 to 465 of FIG. 4 illustrate an exemplary implementation of the double grooving phase, and in exemplary detail, at 430, a new listener starts the double grooving phase having completed the tutorial. Double grooving is the process by which a new listener's understanding and accuracy are confirmed. At 435, a new listener codes the fundamental properties of several pieces of media entities, such as music, that a system creator, or expert, has also coded. Coding, as utilized herein, refers to the assigning of values and/or descriptions to the fundamental properties of media entities so as to classify the music according to the canonical set of fundamental media properties. An expert also codes the music along side of or after the new listener coding, or the music may be pre-coded by one or more experts.

At 440, the new listener's data is compared to data coded by an experienced listener, or expert. This comparison process comprises several options, via a statistical and/or non-statistical process, including but not limited to: 1) taking a batch of songs and calculating correlation scores across a set of specified properties; 2) taking a batch of songs and calculating the percentage of songs in which the raters are within plus/minus one classification scaling from each other across a set of specified properties; and 3) examining song-by-song every property for that song, with co-listening and discussion of what is heard via the definition parameters provided for each property in the tutorial.

At 445, as a result of the double grooving comparison, certain fundamental musical properties are designated as ones for which a new listener needs more work beyond the tutorial. By the same token, certain fundamental musical properties are designated as ones for which the new listener does not need more work beyond the tutorial. For the properties requiring no further training, the new listener becomes a groover. Thus, at 450, the new listener/groover begins submitting data on new songs for "passed" properties but will get further training examples of "not passed" properties. These further training examples are gleaned from the existing database and organized into blocks by classification level at 455. After examining these blocks, the new listener does follow-up double grooving at 460 to confirm that the property can be "passed." 450 to 460 are repeated until the new listener has been passed on all the fundamental musical properties. Once passed on all properties, the new listener is a full fledged groover at 465, meaning that listener is permitted to submit from more extensively to completely coded data into the database for each new song.

Fundamental Properties of Media Entities for Training Tutorial Process

As mentioned above, the process of the present invention includes a tutorial for educating a new listener as to fundamental media properties. The tutorial is predicated upon the canonical set of classification terms, ranges and descriptions set by the designers of the system. An exemplary set of non-limiting classification terms, ranges and descriptions is presented below. Various permutations and combinations thereof are contemplated.

In an exemplary embodiment, the fundamental properties of media entities, such as songs, are grouped into three main areas: Rhythm, Zing and Mood.

Rhythm may include Tempo, Time Signature, Rhythm Description, Rhythm Type and Rhythmic Activity.

Tempo is the quarter note "pulse" of the song/section. When determining whether the tempo is slow or fast i.e., 50 beats per minute (bpm) or 150 bpm, after tapping in tempo, a listener may consider dancing to this song. In this regard, the listener's internal groove clock leads the way. Tempo may be measured in bpm, and may be rated slow (0–60 bpm), medium slow (61–100 bpm), medium fast (101–168 bpm) and fast (greater than 168 bpm).

Exemplary songs and corresponding ratings in bpm for tempo include Jeff Buckley's "Satisfied Mind" (30), Amanda Marshall's "Give Up Giving In" (59), Whitney Houston's "You're Still My Man" (65), Simon and Garfunkel's "The Boxer" (90), Leo Kottke's "Arms of Mary" (90), Al Green's "Love and Happiness" (98), Chicago's "Saturday in the Park" (115), Cream's "Sweet Wine" (124), Jack Sheldon's "Leroy's Blues" (145), Art Blakely and the Jazz Messangers' "Sincerely Diana" (205), Black Flag's "Padded Cell" and Malevolent Creation's "Tasteful Agony" (450).

The time signature of a song denotes how many beats are in each measure of music and which note value receives one beat Time signature is used to indicate the meter of the song and has a top and a bottom number. The bottom number indicates the kind of note used as a unit of time and the top number indicates the number of units in each measure. The choice of songs may be in 3, in 4, or other. For example, a ¾ time signature has three beats per measure, with the quarter note value receiving one beat.

Exemplary songs for a time signature of ¾ with tempo in parentheses in some cases include Lynyrd Skynyrd's "Sweet Home Alabama" (96), David Bowie's "Jean Genie" (131) and Jamiroquai's "Cosmic Girl" (117). Exemplary songs for a time signature of ¾

Rhythm description is the adjective describing the overall vibe or feel of the rhythm. Descriptions may include rockin', frenetic, steady, throbbing, free, funky, groovy, syncopated, stiff, lazy or other.

Examples of rockin' songs include NOFX's "Leave It Alone", Stone Temple Pilots' "Silvergun Superman", 24-7 SPYZ' "Tick, Tick, Tick . . . " and Aerosmith's "Sweet Emotion."Examples of frenetic songs include Dillinger Escape Plan's "The Mullet Burden", Ornette Coleman's "City Living", Squarepusher's "Full Rinse" and "Come On My Selector" and Ornette Coleman's "Monsieur Allard". Examples of steady songs include XTC's "Towers of London", Foo Fighters' "New Way Home" and AC/DC's "Highway to Hell". Examples of throbbing songs include "Traci Lords w/Juno Reactor's "Control", Cosmic Baby's "Fantasia" and System 7's "Night Owl." Examples of Free songs include John Coltrane's "Om" and Sun Ra Arkestra's "Bygone". Examples of Funky songs include Ohio Players' "Players Balling", Sly and Family Stone's "Sing a Simple Song", George Clinton's "Last Dance", Red Hot Chili Peppers' "Sir Psycho Sexy" and James Brown' "Sex Machine". Examples of Groovy songs include Morcheeba's "The Sea", Bill Withers' "Use Me" and Buckshot Da B. D. I. Emeee's "No Joke". Examples of Syncopated songs include John Scofield's "Otay", Peter Gabriel's "In Your Eyes", JA RULE's "Let's Ride" and Silkk The Shocker's "Thug 'n' Me."

Rhythm type is the characteristic rhythm or pattern i.e., shuffle, rhumba, etc. Types may include straight, shuffle, swing, disco, reggae, hip-hop, shuffle, bossa, samba or other.

Examples of straight songs include AC/DC's "Sin City", Los Lobos' "Viking" and Stone Temple Pilots' "Plush. " Examples of Bossa songs include Antonio Carlos Jobim's "Triste Alegria", Michael Franks' "Every Time She Whispers" and Beck's "Tropicalia."Examples of Samba songs include Cal Tjader's "Roger's Samba", Carlinhos Brown's "Amantes Cinzas" and Stan Getz' "Captain Marvel". Examples of shuffle songs include Joe Louis Walker's "Moanin' News", Joan Osbourne's "Help Me" and Aretha Franklin's "(No, No) I'm Losing You". Examples of swing songs include Miles Davis' "So What", Art Blakely's "The Song is You" and Tony Bennett's "Shall We Dance". Examples of reggae songs include Peter Tosh's "Legalize it", Bob Marley's "Jammin" and Jimmy Cliff's "Pressure Drop." Examples of hip hop shuffle songs include Miles Davis' "Tu Tu", Cibo Matto's "Sugarwater", Funkmaster Flex' "Peter Gunz and Lord Tariq Freestyle", NAS' "NAS Is Like" and Gang Starr's "Work". Examples of songs that are not hip hop shuffle, but are straight and groovy, include Beastie Boys' "Shadrach" and Gang Starr's "Soliloquy of Cbaos."

Rhythmic activity is the busy-ness of the rhythm. With rhythmic activity, the higher the number of attacks, the higher the rhythmic activity. As a general matter, rhythmic activity increases accordingly with melodic movement. Rhythmic activity may be rated from 1 (low) to 10 (high). For example, and generally speaking, a rating of 1 indicates no drums or percussion. A rating of 2 indicates very sparse percussion. A rating of 3 indicates very sparse rums. A rating of 4 indicates may indicate a basic jazz kit with brushes and/or light drums with very simple beats or light brush rhythms. A rating of 5 may indicate a basic drum kit i.e., a basic beat without too many fills. A rating of 6 may indicate a basic drum kit with percussion, more fills and busier grooves. A rating of 7 may indicate an up tempo with $16^{ths}$ on the hat, and so on to a rating of 10.

Exemplary songs having a rhythmic activity rating of 1 include K. D. Lang's "No Where to Stand", Sarah Vaughan's "Just In Time" and Snooks Eaglin's "Mailman Passed". Exemplary songs having a rhythmic activity rating of 2 include Ted Hawkins' "Big Things" and Archie Roach's "Sister Brother". An exemplary song having arhythmic activity rating of 3 is Dinah Washington's "I Left My Heart In San Francisco". Exemplary songs having a rhythmic activity rating of 4 include Willie Nelson's "Crazy", Blood, Sweat and Tears' "Hi-De-Ho" and Nat King Cole's "L.O.V.E". Exemplary songs having a rhythmic rating of 5 include The Beatles' "With A Little Help From My Friends" and Kenny Rogers' "The Gambler". Exemplary songs having a rhythmic rating of 6 include Loverboy's "Working for the Weekend", Patsy Cline's "Back in Baby's Arms", Al Green's "Let's Stay Together" and Aerosmith's "Sweet Emotion." Exemplary songs having a rhythmic activity rating of 7 include U2's "New Year's Day", Beastie Boys' "Funky Boss" and Primus' "John the Fisherman". Exemplary songs having a rhythmic activity rating of 8 include Square Pusher's "Come On My Selector" and Pat Metheny's "Song X." Exemplary songs having a rhythmic activity rating of 9 include Chick Corea's "Love Castle" and NOFX' "Lori Meyers." Exemplary songs having a rhythmic activity rating of 10 include Dillinger Escape Plan's "Mullet Burden" and Atari Teenage Riot's "Start The Riot."

In the case of Zing, the sub-categories may include Consonance, Density, Melodic Movement and Weight.

Consonance is a property that is associated with musical intervals or chords that sound pleasant. Generally, the unison, major and minor $3^{rds}$, perfect $4^{ths}$ and $5^{ths}$ and the major and minor $6^{ths}$ are considered consonant. All others are generally considered dissonant. A listener should try to listen for the "in-ness" and resolution of the chords and progression in order to determine consonance. Consonance may be measured in a range from 1 (dissonant) to 10 (consonant).

Examples of songs with a consonance rating of between 1 and 2 include Flying Saucer Attack's "Still", The Doors' "Horse Latitudes" and Flying Saucer Attack's "Rainstorm Blues". Examples of songs with a consonance rating of between 3 and 4 include St. Etienne's "Wilson", The Crystal Method's "Cherry Twist" and Bauhaus' "Hallow Hills". Examples of songs with a consonance rating of 5 include Massive Attack's "Five Man Army", G. Love and Special Sauce's "Cold Beverage" and the Miles Davis Quintet's "Orbits". Examples of songs with a consonance rating of between 6 and 7 include Aretha Franklin's "Baby I Love You", Mance Lipscomb's "Mama Don't Allow", Blink 182's "What's My Age Again", Lucinda Williams' "Concrete and Barbed Wire" and Keith Jarrett's "God Bless the Child." Examples of songs with a consonance rating of between 8 and 9 include the Byrds' "Ballad of Easy Rider", Janet Jackson's "Tonight's the Night", The Gypsy Kings' "Montana", Michael Jackson's "The Girl is Mine" and "This Land" from the Lion King Soundtrack.

Density measures the overall fullness of the sound. It is not necessarily a reflection of the number of instruments involved nor a reflection of weight. Density may be measured from 1 (low density) to 10 (high density).

Examples of songs with a Density rating of between 1 and 2 include, Gyorgy Ligeti "Musica Ricerata, II", Anggun's "Selamanya", G. Love & Special Sauce's "I Love You", and Miles Davis' "Green". Examples of songs with a Density rating of between 3 and 4 include, CSN&Y's "Guinnevere", Ween's "I Play It Off Legit", Janet Jackson's "Got Til It's Gone", and Fugees' "Killing Me Softly". Examples of songs with a Density rating of 5 include, James Brown's "Sex Machine", Los Lobos' "Oh Yeah", and Black Crowes' "Hard To Handle". Examples of songs with a Density rating of between 6 and 7 include, Depeche Mode's "Black Celebration", Jethro Tull's "Locomotive Breath", Massive Attack's "Hymn Of The Big Wheel", Pavement's "Unfair", The Gipsy Kings' "Volare", and Jaco Patorius' "Soul Intro/The Chicken (Live)". Examples of songs with a Density rating of between 8 and 9 include, The Verve's "Bitter Sweet Symphony", Helmet's "Harmless", and Atari Teenage Riot's "Start The Riot".

Melodic movement describes the amount the instrument/voice moves from the tonic or root notes, or from the pattern of pitches up, down or continuing on one note. Since melody is not entirely independent of motion or rhythm, rhythmic activity is affected by and changes accordingly with melodic movement. Melodic movement may be measured from 1 (low movement) to 10 (high movement).

Exemplary songs having a melodic movement of between 1 and 2 include Godflesh's "Wounds" and the Beastie Boys' "Finger Licken Good". Exemplary songs having a melodic movement of between 3 and 4 include Flying Saucer Attack's "A Silent Tide", Thievery Cooperation's "Encounter in Bahia", Arrested Development's "Mr. Wendel" and Keith Hudson's "Rub Dub". Exemplary songs having a melodic movement of 5 include Kid Rock's "Wasting Time", G. Love and Special Sauce's "The Things That I Used To Do" and The Ramones' "I Want To Be Sedated". Exemplary songs having a melodic movement of between 6 and 7 include 10,000 Maniacs' "Candy Everybody Wants", Prince's "Pope", Lauryn Hill's "Everything is Everything", Bob Marley's "I Shot The Sheriff" and Green Day's "Panic Song". Exemplary songs having a melodic movement of between 8 and 9 include Tal Bachman's "She's So High", Massive Attack's "Tear Drop", Destiny's Child's "No No No Part 2" and Mariah Carey's "One Sweet Day". An exemplary song having a melodic movement of 10 is Nusrat Fateh Ali Khan's "The Game".

Weight is a general measure of the "heaviness" of the sound. Weight may be measured from 1 (light) to 10 (heavy).

Exemplary songs having a weight of between 1 and 2 include The Benedictine Monks' "Puerl Hebraeorum", Bob Dylan's "If You See Her, Say Hello", Tony Bennett's "I'm In Love Again" and John Cage's "In A Landscape". Exemplary songs having a weight of between 3 and 4 include Sade's "Your Love is King", George Strait's "Beyond the Blue Neon" and Larry Carlton's "All in Good Time". Exemplary songs having a weight of 5 include Blues Traveller's "Run Around", Gipsy kings' "Pajarito", Greyboy Allstars' "Fried Grease", Arrested Development's "Mr. Wendal" and G. Love and Special Sauce's "Garbage Man". Exemplary songs having a weight of between 6 and 7 include Veruca Salt's "Awesome", Jimi Hendrix' "Fire" and John Coltrane's "Pursuance—Psalm". Exemplary songs having a weight of between 8 and 9 include Anthrax' "Among the Living", Pantera's "Art of Shredding", Metallica's "Disposable Heroes and Dillinger Escape Plan's "Sandbox Magician".

In the case of Mood, the sub-categories may include Emotional Intensity, Mood and Mood Description.

Emotional intensity is generally a measure of the intensity of the voice/instrument. Can also measure the emotional delivery of voice/instrument. Emotional intensity may be measured from 1 (low) to 10 (high).

Exemplary songs having an emotional intensity of between 1 and 2 include Gary Burton's "Wasn't Always Easy", John Cage's "In A Landscape", Cal Tjader's "This Couldn't Be The Real Thing" and Teenage Fanclub's "Hardcore-Ballad". Exemplary songs having an emotional intensity of between 3 and 4 include The Beatles' "Blackbird", Edie Brickell and the New Bohemians "I Do", Tony Bennett's "It Had To Be You", Ben Lee's "Eight Years Old", Depeche Mode's "Somebody", Garth Brooks' "The Thuder Rolls" and Miles Davis' "Blue in Green". Exemplary songs having an emotional intensity of 5 include Fugees' "Ready or Not", Al Green's "Let's Stay Together" and Cuban All Stars' "Habana Del Estes". Exemplary songs having an emotional intensity of between 6 and 7 include Nusrat Fateh Ali Khan's "Shadow", Alice in Chains' "Would", Beastie Boys' "Johnny Ryall", Chich Corea Quartet's "New Life", David Bowie's "Fame", Melissa Etheridge's "If I Wanted To" and Eric Clapton's "River of Tears". Exemplary songs having an emotional intensity of between 8 and 9 include Buckwheat Zydeco's "Driving Old Grey", Jane's Addiction's "Stop" and Art Blakely's "Amuck". Exemplary songs having a an emotional intensity of 10 include Slayer's "Screaming From The Sky", The Jon Spencer Blues Explosion's "Identify", Pearl Jam's "Blood" and Marilyn Manson's "1996."

Mood is the emotional value by the song/section. May be determined by chordal types and melody (major chords/melody=positive, minor chords/melody=negative or depressed) or by general consonance/dissonance of the song. Mood may be measured from 1 (dark) to 10 (light).

Examples of songs with a Mood rating of between 1 and 2 include, Marilyn Manson's "1996", Teenage Fanclub's "Satan", Bone Thugs-N-Harmony's "No Surrender", and Body Count's "Voodoo". Examples of songs with a Mood rating of between 3 and 4 include, The Eagles' "Witchy Woman", Teenage Fanclub's "Hardcore Ballad", and Grant Lee Buffalo's "Lady Godiva And Me". Examples of songs with a Mood rating of 5 include, Gin Blossoms' "Until I Fall Away", Melissa Etheridge's "I Will Never Be The Same", and Ruth Ruth's "Uninvited". Examples of songs with a Mood rating of between 6 and 7 include, James Taylor's "Up On The Roof", Eric Clapton's "My Father's Eyes", The Eagles' "Take It Easy", Chet Baker's "Tenderly", and Doobie Brothers' "Travelin' Man". Examples of songs with a Mood rating of between 8 and 9 include, Al Hirt's "Bourbon Street Parade", Kenny Loggins' "I Believe In Love", Tony Bennett's "The Moment Of Truth", Jimmy Smith's "Makin' Whoppee" and Earth, Wind and Fire's "Saturday Nite".

Mood description is the adjective describing the overall vibe or feel of the song or piece. Mood descriptors include dreamy, soothing, trippy, depressing, lonely, creepy, angry, groovy, sexy, rockin', neutral, fun, uplifting and quirky.

Examples of dreamy songs include Beck's "Blackhole", The Verve's "Already There" and Cocteau Twins' "Whales Tails". Examples of soothing songs include Harold Budd's "Memory Gongs", Peter Gabriel's "Open" and Dean Evenson's "Mossing Around". Examples of uplifting songs include John Denver's "Rocky Mountain High", Earth, Wind and Fire's "Let Your Feelings Show" and Slave's "The Happiest Day". Examples of lonely songs include MDO's "Yo Solo Pienso", Pink Floyd's "Mother" and James Taylor's "Song For You Far Away". Examples of angry songs include Nirvana's "Tourettes", Rollins Band's "Obscene" and Beastie Boys' "Time For Livin'". Examples of fun songs include Green Day's "Burnout", Ricky Skaggs' "Hummingbird" and Beastie Boys' "Hey Ladies". Examples of creepy songs include The Cure's "A Forest", Lisa Gerrard's "The Rite" and The Lox's "Livin' The Life". Examples of quirky songs include They Might Be Giants' "32 Footsteps", Primus' "Coattails Of A Dead Man" and Frank Zappa's "G Spot Tornado." Examples of trippy songs include Radiohead's "Climbing Up The Walls", Massive Atack's "Backward Sucking (Heat Miser)" and Can's "Spray."

Once A Groover, Media Entity Coding Privileges Granted

As described above, once a new listener is "passed" for assessment and recognition of all of the fundamental media properties, the new listener is considered a groover, and may code or classify new media entities, such as songs or song segments.

In an exemplary embodiment for the classification of new songs or song segments, a groover enters values for two types of attributes for the song or song segment: song-level attributes and voice-level attributes. Some of these attributes are similar to the fundamental properties described above.

Song-level attributes may include tempo, weight, harmony, intensity, density, consonance, chordal movement, mood, range, flow, dynamics, rhythm description, rhythm type, rhythmic activity, rhythm flexibility, rhythm time signature and description.

Tempo is described as the overall speed of the most prominent beat, in beats per minute (bpm). The groover determines tempo by tapping along. Weight describes the weight of the song or section. Harmony describes how consonant or tight the harmony is. An intuitive way of thinking of harmony is to ask the question, "Does the song or segment make you want to whistle?" Intensity describes the energy of the song or section. A low score implies a soothing relaxing sound, whereas a high score makes one want to roughhouse in a mosh pit. Density describes the number of instruments present, and thus the fullness of the sound. Consonance describes the "in-ness" of the chords. Chordal movement describes the number of chords used in the section. If the song or segment uses only one or two chords throughout, the song or segment has low chordal movement. Mood is the emotional content evoked by the song, basically determined by major chords (positive feel) or minor chords (negative feel). Range describes whether the lead instrument or voice plays a predominantly low or high frequency in the song or section. Flow describes the overall flowing effect of a song. FIG. 5 illustrates a high level view of differences in songs having different flow. Songs with little flow are jagged over time whereas songs with high flow transition smoothly. Flow may be valued from broken to dreamy, with broken having low flow and with dreamy having high flow.

Dynamics describe the magnitude of volume shifts throughout the song or section. Rhythm descriptions and types include adjectives for the song or segment. Rhythm flexibility describes the variance of the rhythmic feels and/or tempo throughout the song or section. Rhythm time signature of the song or section is selected from a list having ¼, ¾, ²⁄₄ or other. A textual description may also be given to the song if it has multiple distinct sections, such as "the opera part of Bohemian Rhapsody." Other attributes can be coded in accordance with the present invention as well. For example, another attribute could be beat which measures the heaviness of the kick drum and low end frequencies. Beat is a measure of the weight of the "pulse."

Voice-level attributes include prominence, melodic movement, intensity, ornamentation, cleanliness, rhythm activity and whether the song has a solo.

Prominence describes the level of the instrument e.g., a bass guitar, in the mix. The general prominence model generally runs in the following decreasing order: vocals, drums, bass, guitars, keys, BG Vox, horns, strings and percussion. Melodic movement describes the degree with which the instrument moves from the "bass" note. Intensity describes the weight of the section. Ornamentation describes the degree of embellishment, improvised on the piece as written. Cleanliness describes the quality of the notes. Rhythm activity describes the degree of "busy-ness" in the section. Whether or not the instrument has a solo is described by the 'has a solo' attribute.

Song ratings utilizing a range from 1 to 10 can also be described from low to high, light to heavy, etc., and thus the present invention is not limited to particular classification ranges. For example, other exemplary song ratings include: for Weight/Intensity: Garrison Starr (light), Sheryl Crow "Sweet Child" (Light/Med.), Pearl Jam "Dissident" (Med./Heavy) and Helmet "Meantime" (Heavy), for Density: Edwin McCain (Sparse), Morphine (Sparse/Med.), Cracker "I Hate My Generation" (Med./Dense), The Verve "Bitter Sweet Symphony" (Dense), for Consonance: Sublime "What I Got" (In), Sarah McLachlin "Sweet Surrender" (In/Med.), Sonic Youth (Med./Out), John Coltrane (Out), for Chordal Movement: CornerShop (Low), Tom Petty "Won't Back Down" (Low, Med.), Elton John "Daniel" (Med./High), Beatles "I am the Walrus" (High), for Mood: Beatles "Magical Mystery Tour" (Light), Dave Matthews Band "Stay" (Light/Med.), Pretenders "Middle of the Road" (Med./Dark), Paul Weller "Wildwood" (Dark), for Dynamics: Massive Attack "Safe from Harm" (Low), U2 "Mysterious Ways" (Low/Med.), Weezer "Say it Ain't So" (Med./High), Nine Inch Nails "March of the Pigs" (High), for Melodic Movement: Tupoc Shakur (Narrow), SmashMouth "All Star" (Narrow/Med.), XTC "Hold Me My Daddy" (Wide), and for Rhythmic Flexibility: Police "Voices Inside My Head" (Low), Primus "Welcome to this World" (High).

As mentioned above, the media contemplated by the present invention in all of its various embodiments is not limited to music or songs, but rather the invention applies to any media to which a classification technique may be applied that merges perceptual (human) analysis with acoustic (DSP) analysis for increased accuracy in classification and matching.

The various techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention. For example, the storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary embodiments of the invention are described in the context of music data, one skilled in the art will recognize that the present invention is not limited to the music, and that the methods of training, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate. Therefore, the present invention should not be limited to any single embodiment, but rather construed in breadth and scope in accordance with the appended claims.

What is claimed is:

1. A method for training a trainee to assign to a media entity at least one value corresponding to at least one fundamental property of a plurality of fundamental properties of the type of media entity via a computing device, comprising:

rendering definitional classification information to the trainee to educate the trainee as to the nature of said plurality of fundamental properties;

receiving by the computing devices at least one trainee-assigned value corresponding to said at least one fundamental property of the plurality of fundamental properties of the media entity after said rendering, said at least one trainee-assigned value equal in number to at least one expert-assigned value assigned to said at least one fundamental property of said plurality of fundamental properties of the media entity by at least one expert;

comparing by the computing device the at least one trainee-assigned value to the corresponding at least one expert-assigned value; and determining based on said comparing a first group of said at least one fundamental property of the plurality of fundamental properties for which said trainee is qualified to code values for new media entities, wherein the media entities are one of song and song segments.

2. The method for training according to claim 1, wherein said comparing includes comparing, value by value, the at least one trainee-assigned value to the corresponding at least one expert-assigned value.

3. The method for training according to claim 1, further including determining based on said comparing a second group of said at least one fundamental property of the plurality of fundamental properties for which said trainee is not qualified to code values for new media entities.

4. The method for training according to claim 3, further including redoing the rendering, receiving, comparing and determining for fundamental properties of the second group until all properties in said second group are in said first group.

5. The method for training according to claim 4, wherein when all fundamental properties are in said first group, said trainee is a groover for all fundamental properties.

6. The method for training according to claim 1, wherein said definitional information includes definitional information about rhythm, zing and mood.

7. The method according to claim 6, wherein said definitional information for rhythm comprises definitional information for tempo, a time signature, rhythm description, rhythm type and rhythmic activity.

8. The method according to claim 6, wherein said definitional information for zing comprises definitional information for consonance, density, melodic movement and weight.

9. The method according to claim 6, wherein said definitional information for mood comprises definitional information for emotional intensity, mood and mood description.

10. The method for training according to claim 1, wherein said rendering includes rendering said definitional classification information to the trainee via the Web.

11. The method for training according to claim 1, wherein said comparing includes performing statistical analysis on said at least one trainee-assigned value and said at least one expert-assigned value.

12. The method for training according to claim 11, wherein said comparing includes calculating correlations between said at least one trainee-assigned value and said at least one expert-assigned value.

13. The method for training according to claim 1, wherein said comparing includes at least one of 1) Taking a batch of songs and calculating correlation scores across a set of specified fundamental properties, 2) Taking a batch of songs and calculating the percentage of songs in which the at least one expert and the trainee are within plus/minus one classification scaling from each other across a set of specified fundamental properties and 3) examining song-by-song every property for that song, with co-listening and discussion of what is heard via the definition parameters provided for each fundamental property.

14. The method for training according to claim 1, wherein said comparing includes at least one of comparing with a statistical analysis and comparing with a non-statistical analysis.

15. The method for training according to claim 1, wherein said trainee is authorized to code new media entities for said first group of said at least one fundamental property of the plurality of fundamental properties.

16. The method for training according to claim 1, wherein said rendering of said definitional information includes rendering at least one of a song segment and song to said trainee, said at least one of a song segment and song serving as at least one example of said at least one fundamental property of said plurality of fundamental properties.

17. A The method for training according to claim 16, wherein said at least one of a song segment and song are selected from a playlist generating engine capable of matching songs to the at least one fundamental property of said plurality of fundamental properties.

18. A computing device comprising:

means for rendering definitional classification information to a trainee to educate the trainee about a plurality of fundamental properties associated with a type of media entity;

means for receiving by the computing device at least one trainee-assigned value corresponding to said at least one fundamental property of the plurality of fundamental properties of the media entity, said at least one trainee-assigned value equal in number to at least one expert-assigned value assigned to said at least one fundamental property of the plurality of fundamental properties of the media entity by at least one expert;

means for comparing by the computing device the at least one trainee-assigned value to the corresponding at least one expert-assigned value; and means for determining based on at least one output from said means for comparing a group of said at least one fundamental property of said plurality of fundamental properties for which said trainee is qualified to code values for new media entities, wherein the media entities are one of songs and song segments.

19. A computing system for training a trainee to classify music, comprising:

a display for rendering definitional classification information to the trainee to educate the trainee as to the nature of a plurality of fundamental music properties associated with musical compositions; and audio rendering means for rendering at least one of a song segment and song to said trainee, said at least one of a song segment and song serving as at least one example of at least one fundamental property of said plurality of fundamental music properties associated with musical compositions;

means for receiving from a trainee classification data for classifying said at least one of a song segment and song rendered by said audio rendering means;

means for analyzing said classification data; and means for determining whether said trainee is qualified to enter classification data for said at least one fundamental music property of said plurality of fundamental music properties associated with musical compositions.

20. The computing system for training according to claim 19, wherein said means for analyzing includes means for comparing said classification data to known classification data for said at least one of a song segment and song.

21. The computing system for training according to claim 20, wherein said means for comparing includes means for performing statistical analysis on said classification data from the trainee and said known classification data.

22. The computing system for training according to claim 21, wherein said means for comparing includes means for calculating correlations between the classification data from the trainee and said known classification data.

23. The computing system for training according to claim 19, wherein said definitional information includes definitional information about rhythm, zing and mood.

24. The computing system according to claim 23, wherein said definitional information for rhythm comprises definitional information for tempo, a time signature, rhythm description, rhythm type and rhythmic activity.

25. The computing system according to claim 23, wherein said definitional information for zing comprises definitional information for consonance, density, melodic movement and weight.

26. The computing system according to claim 23, wherein said definitional information for mood comprises definitional information for emotional intensity, mood and mood description.

27. A method for training a trainee via a computing device to analyze music in order to recognize and assess the fundamental musical properties thereof, the method comprising:

providing a trainee with a list of fundamental musical properties grouped into three main areas: rhythm, zing and mood;

providing the trainee with written definitions for the three main areas: rhythm, zing and mood;

selecting via the computing device one of the three main areas: rhythm, zing and mood;

displaying to the trainee a list of song examples organized by classification level;

playing via the computing device to the trainee the song examples one-by-one, progressing through each classification level;

repeating the selecting, displaying and playing for the remaining two of the three main areas: rhythm, zing and mood;

playing via the computing device songs to the trainee and a previously trained listener;

receiving codes assigned to the songs by the trainee and the previously trained listener according to the three main areas: rhythm, zing and mood and according to classification level;

comparing the codes assigned by the trainee with the codes assigned by the trained listener; and determining based on said comparing which, if any, of said three main areas said trainee is qualified to assign codes for new media entities.

28. A computer readable medium bearing computer executable instructions for training a trainee to assign to a media entity at least one value corresponding to at least one fundamental property of a plurality of fundamental properties of the type of media entity via a computing device, said executable instructions comprising instructions for:

rendering definitional classification information to the trainee to educate the trainee as to the nature of said plurality of fundamental properties;

receiving by the computing device at least one trainee-assigned value corresponding to said at least one fundamental property of the plurality of fundamental properties of the media entity after said rendering, said at least one trainee-assigned value equal in number to at least one expert-assigned value assigned to said at least one fundamental property of said plurality of fundamental properties of the media entity by at least one expert;

comparing by the computing device the at least one trainee-assigned value to the corresponding at least one expert-assigned value; and determining based on said comparing a first group of said at least one fundamental property of the plurality of fundamental properties for which said trainee is qualified to code values for new media entities, wherein the media entities are one of songs and song segments.

29. The computer executable instructions of claim 1 further comprising instructions whereby said comparing includes comparing, value by value, the at least one trainee-assigned value to the corresponding at least one expert-assigned value.

30. The computer executable instructions of claim 1 further comprising instructions whereby said rendering includes rendering said definitional classification information to the trainee via the Web.

* * * * *